United States Patent
Katz

(10) Patent No.: US 6,663,690 B2
(45) Date of Patent: Dec. 16, 2003

(54) REMOVAL OF ELEMENTAL MERCURY BY PHOTOIONIZATION

(75) Inventor: Joseph L. Katz, Baltimore, MD (US)

(73) Assignee: Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/252,124

(22) Filed: Sep. 23, 2002

(65) Prior Publication Data

US 2003/0079606 A1 May 1, 2003

Related U.S. Application Data

(60) Provisional application No. 60/324,094, filed on Sep. 24, 2001.

(51) Int. Cl.$^7$ ............................ B03C 3/014; B03C 3/016
(52) U.S. Cl. ........................ 95/57; 95/71; 96/16; 96/52; 96/224; 422/24; 422/186.04
(58) Field of Search .............................. 96/16, 224, 52, 96/53; 95/57, 71; 422/22, 24, 121, 186.04; 204/157.21, 157.22

(56) References Cited

U.S. PATENT DOCUMENTS

| | | | | | |
|---|---|---|---|---|---|
| 1,801,515 | A | * | 4/1931 | Marshall | 96/96 |
| 4,203,948 | A | * | 5/1980 | Brundbjerg | 422/121 |
| 4,574,004 | A | * | 3/1986 | Schmidt-Ott et al. | 95/79 |
| 4,648,951 | A | * | 3/1987 | Maya | 204/157.21 |
| 4,793,907 | A | * | 12/1988 | Paisner et al. | 204/157.22 |
| 4,876,852 | A | * | 10/1989 | Abthoff et al. | 60/275 |
| 5,219,534 | A | * | 6/1993 | Reynolds | 422/186.3 |
| 5,656,242 | A | * | 8/1997 | Morrow et al. | 96/224 |
| 5,935,538 | A | * | 8/1999 | Tabatabaie-Raissi et al. | 423/215.5 |

OTHER PUBLICATIONS

Environmental Protection Agency, "Regulatory Finding on the Emissions in of Hazardous Air Pollutants from Electric Utility Steam Generating Units", Federal Register, Vol 65, No. 245, 79825–79831 Dec. 20 (2000).

Johnson, J. "Power Plant to Limit Mercury", Chemical Engineering News, Jan. 1, 18–19, (2001).

Yokoyama, T. et al., "Mercury emissions from a coal–fired power plant in Japan", Science of the Total Environment, 259, 97–103 (2000).

Encyclopedia of Chemical Engineering, $4^{th}$ edition, vol. 1, 778–787, New York, Wiley, 1998.

Ray, Isaac, "The Quest for a better Submicron Particle Trap", Environmental Technology, May/Jun. 1997.

Ogawa, A., Separation of Particles from Air and Gases, vol. 2, 117–122, Boca Raton: CRC Press, 1984.

Ereifej, H. N., Doster, G.J. et al. "Extreme Sensitivity in Trace Element Detection", Appl. Phys. B 68, 141–144 (1999).

(List continued on next page.)

*Primary Examiner*—Richard L. Chiesa
(74) *Attorney, Agent, or Firm*—Whitham, Curtis & Christofferson, P.C.

(57) ABSTRACT

Elemental mercury is removed from emissions of coal-fired utilities by the selective photoionization of mercury atoms using ultraviolet light, followed by electrostatic precipitation of the mercury ions. Mercury is first exposed to light of a wavelength which boosts the mercury to an excited state. Then mercury is ionized using light of a different wavelength. The ionized mercury atoms are exposed to supersaturated water vapor to produce charged droplets which are precipitated, such that the exhaust effluent is substantially devoid of mercury or the mercury level is substantially reduced.

30 Claims, 2 Drawing Sheets

OTHER PUBLICATIONS

Clevenger, W. L. et al, "Analytical time–resolved laser enhanced ionization spectroscopy I", Spectrochimica Acta Part B, 52, 295–304 (1997).

Podshivalov, A.A., et al., "A Novel and efficient excitation and ionization scheme for laser resonance ionization of mercury", Spectrochimica Acta Part B, 54, 1793–1799 (2000).

Edner, H. Faris, G.W., Sunesson, A., and Svanberg, S., "Atmospheric atomic mercury monitoring using differential absorption lidar techniques", Applied Optics, 28 (5), 921–930 (1989).

* cited by examiner

REMOVAL OF ELEMENTAL MERCURY BY PHOTOIONIZATION

CROSS-REFERENCE TO RELATED APPLICATION

This application claims benefit of U.S. Provisional Application Serial No. 60/324,094, filed Sep. 24, 2001, the complete contents of which are hereby incorporated by reference.

BACKGROUND OF THE INVENTION

1. Field of the Invention

The invention generally relates to the removal of elemental mercury. In particular, the invention provides methods for the removal of elemental mercury from a gas, typically air, via selective photoionization, followed by electrostatic precipitation.

2. Background Description

The minimization of mercury emissions from coal-fired power plants is of great interest since mercury is a potential human health hazard, even at very low concentrations. A very recent EPA notice of regulatory finding[1] states (on page 79,827, in the first paragraph, first sentence), "Based on the assessment of hazards and risks due to emissions of HAP (Hazardous Air Pollutants) from electric utility steam generating units, mercury is the HAP of greatest concern." Coal-fired utilities are currently the source of approximately one third of the mercury deposited across the U.S.[2] Much of this mercury is in elemental form, a form that can remain in the atmosphere for long periods of time[2]. Some of this mercury lands in lakes where it is readily converted into methylmercury, a bioaccumulating neurotoxin.[1,2]

The EPA notice of regulatory finding[1] goes on to explain that mercury in the flue gas from coal combustion may be present in three different forms. The forms, called species, include elemental mercury, divalent oxidized forms, and mercury adsorbed onto the surface of fly ash or other particles. Adsorbed mercury onto particles is removable using conventional devices such as electrostatic precipitators (ESP). The divalent forms of mercury are generally water soluble and removable in wet scrubbers or in flue gas desulfurization (FGD) systems[1,3]. However, "elemental mercury is insoluble in water, does not react with alkaline reagents used in FGD systems, and cannot be captured in wet scrubbers,"[1] consequently elemental mercury remains mostly unremoved from flue gas.

Even when equipped with a dry ESP and a FGD, coal-fired utilities fail to remove about a third of the mercury from burnt coal[3]. Almost all of this mercury is in elemental form. In a dry ESP much of the elemental mercury either does not become ionized or is re-entrained in the gas during the rapping cycle of the ESP[4]. Since mercury is not soluble in water and does not react with alkaline agents, FGD systems and wet scrubbers also fail to remove the elemental mercury. Even when fully equipped, the atomic mercury concentration[2,3] in a typical coal-fired utility's exhaust is 1 to 10 μg per cubic meter (90 to 900 parts per trillion).

It would be of great benefit to have available methodology designed to remove elemental mercury from such sources and to preclude its deposition into the environment.

SUMMARY OF THE INVENTION

It is an object of the invention to provide a method and apparatus for removing mercury from exhaust effluents.

According to the invention, an exhaust from a coal fired furnace, incinerator, chlorine plant or the like, which is likely to contain mercury, is passed through a first electrostatic precipitator or other suitable device to remove particulate matter. Mercury in the exhaust is exposed to light of wavelength which raises the mercury to an excited state. Light of 253.65 nm is suitable for this purpose. Subsequently, the excited mercury is ionized. This is preferably accomplished using light of a different wavelength. A second electrostatic precipitator removes the ionized mercury from the exhaust so that exhaust emitted to the environment from the exhaust stack is substantially reduced in mercury concentration (e.g., preferably greater than 90% reduced). The process is enhanced by nucleating water particles onto the ionized mercury, such as by exposing the exhaust to supersaturated water vapor. This allows for the electrostatic precipitation of charged water droplets. Sulfur oxides (e.g., sulfur oxide and sulfur dioxide) may also be removed from the exhaust using a wet scrubber or similar apparatus.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
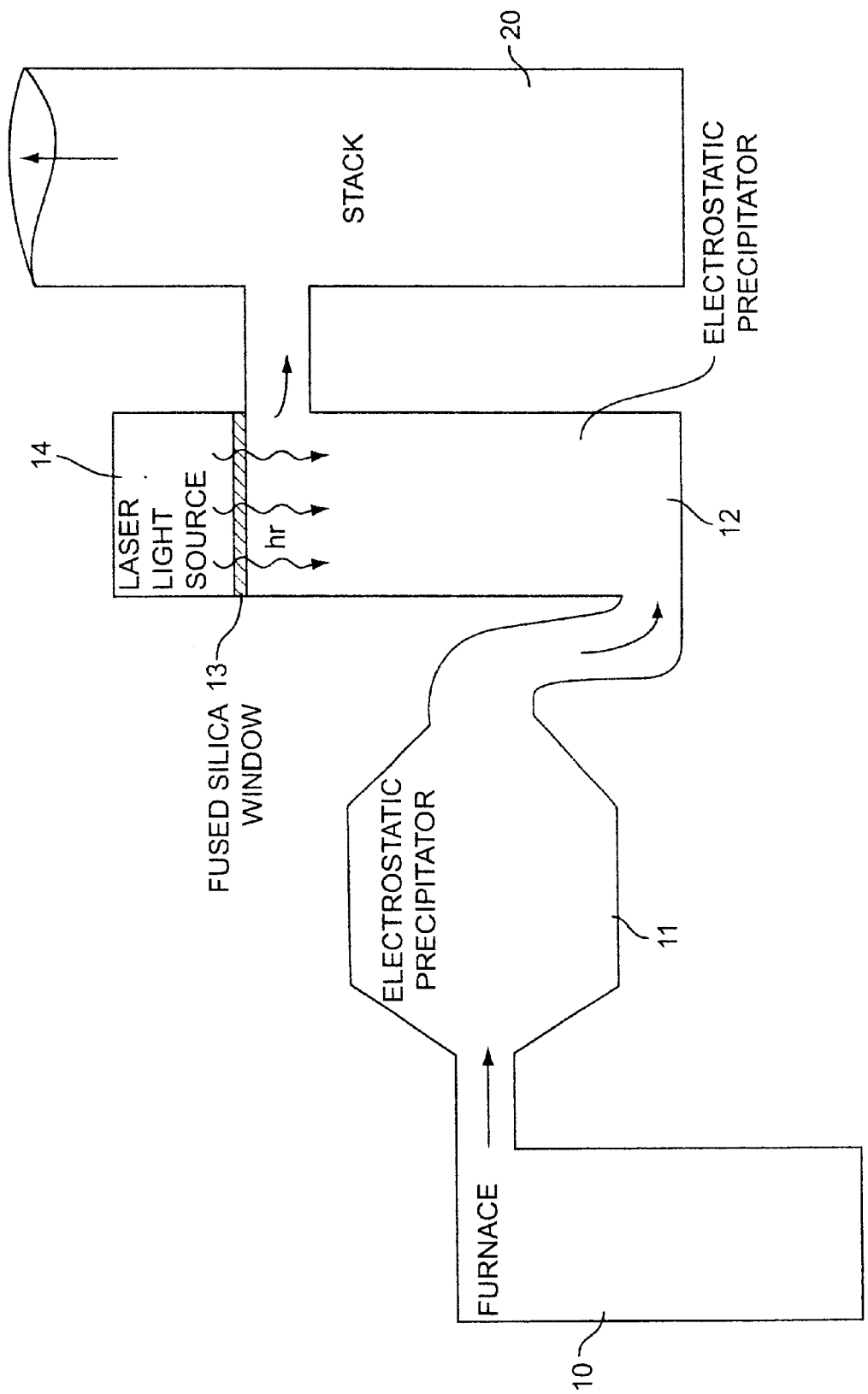
FIG. 1 is a schematic representation of a system which employs photoionization of mercury followed by removal of charged mercury ions via electrostatic precipitation.

The present invention provides a method for effectively charging mercury atoms so that they may be efficiently removed by electrostatic precipitation. This method can be used to remove elemental mercury from, for example, coal-fired utility exhaust and incinerators. The method involves photoionization of mercury atoms using ultraviolet light. Once ionized, the ions can then be removed by electrostatic precipitation, i.e. by impaction.

A typical electrostatic precipitator (ESP) uses a high voltage electrode to charge incoming particles by two methods, ion bombardment and diffusion charging[4]. In ion bombardment, electrons collide with particles thereby giving them a charge. In diffusion charging, particles are charged by collisions with ionized gas molecules. Ion bombardment has been shown to be effective for particles as small as 500 nm. Diffusion charging is effective for particles as small as 50 nm. These limits arise because with decreasing particle size it becomes increasingly unlikely that the particle will be impacted by electrons or by ionized gas molecules respectively[4].

Once charged, a particle will migrate toward an oppositely charged surface. This migration velocity is dependent on the size of the particle. As particle size decreases the migration velocity increases[5,6]. This phenomenon makes electrostatic precipitation very effective at capturing extremely small particles since they will quickly move towards an oppositely charged surface.

Recent studies have shown that it is possible to photoionize elemental mercury[7,8,9]. A typical photoionization scheme involves absorption of three photons, the first one at 253.65 nm, which then is followed by two photon absorptions at 435.83 nm[7,8]. Another well documented path is absorption of a 253.65 nm photon followed by the simultaneous absorption of a 313.18 nm photon and 626.36 nm photon[9].

While several paths to ionization of mercury are possible, to effectively use photoionization to remove extremely small concentrations of atomic mercury from a gas requires efficient use of the photons. The key to removal of atomic mercury using photoionization is the great selectivity provided by making the initial absorption of a 253.65 nm photon. The excited state ($6s6p^3P_1$) thus produced has a relatively long lifetime (>100 ns) and a very large cross section for the absorption of additional photons, which thereby take mercury atoms from this state either to a higher excited state, or directly to the ionization continuum. To cause ionization, thus forming a positively charged mercury ion, requires the absorption of additional photons, whose combined energy is more than 5.68 eV. For example, upon absorbing a 435.83 nm photon a $6s6p^3P_1$ mercury atom is excited to an even higher state ($6s7s^3S_1$) with a lifetime[5] which is long (8 ns) when compared to the duration of a laser pulse (~1 ns), allowing for the absorption of a second 435.83 nm photon, which causes ionization. Alternatively, mercury atom ionization can be accomplished[6] by following the absorption of a 253.65 nm photon with the resonant absorption of a 313.18 nm photon obtained from a frequency doubled 626 nm tunable laser. Ionization then is caused by the absorption of a 626.36 nm photon (i.e. both wavelengths are in the laser beam which exits the doubler).

Once the mercury is ionized, electrostatic precipitation may be used to remove the ionized mercury atoms. The ions are made to flow between oppositely charged plates where they are removed by impaction, i.e. the strong electric field gradient pulls them to the negatively charged plate (collection surface). The collection surface itself may be coated with a material that oxidizes or forms an amalgam with the mercury, thus preventing its revaporization. Examples of such surfaces include but are not limited to gold, silver, zinc powder, etc.

Alternatively, nucleation may also be used to increase ion removal efficiency. For example, passage of the mercury ions through a flow cloud chamber or other vessel containing a supersaturated water environment would cause the formation of water droplets around each mercury ion. These mercury-containing droplets can then be removed using electrostatic precipitation such as with a wet electrostatic precipitator or wet scrubber. Similar conditions prevail in some emission gases where there are high concentrations of water vapor which can undergo ion-induced nucleation onto the mercury ions, followed by electrostatic precipitation of the mercury-containing droplets. By supersaturation, it is meant that in the vessel through with the mercury ions pass, the relative humidity is greater than 1.

Further, depending on the levels of mercury in the exhaust, the desired level of removal, and the particular set-up of the exhaust system, either one of the two methods may be used, or the two may be used in series. For example, the exhaust gas may be subjected to photoionization as described and passed between oppositely charged plates to remove mercury ions; the mercury depleted exhaust may then be passed through a region of high water vapor concentration to cause ion-induced nucleation (with or without additional photoionization). Alternatively, wet condensing, electrostatic precipitation (i.e., ion-induced nucleation), followed by water condensation on the ions and electrostatic removal of the resulting charged droplets, or wet scrubbing of them. Further, multiple "rounds" of photoionization followed by electrostatic precipitation of either or both types may be carried out, depending on the particular application, e.g. the desired level of mercury removal, the overall setup of the emissions system.

Figure 2:
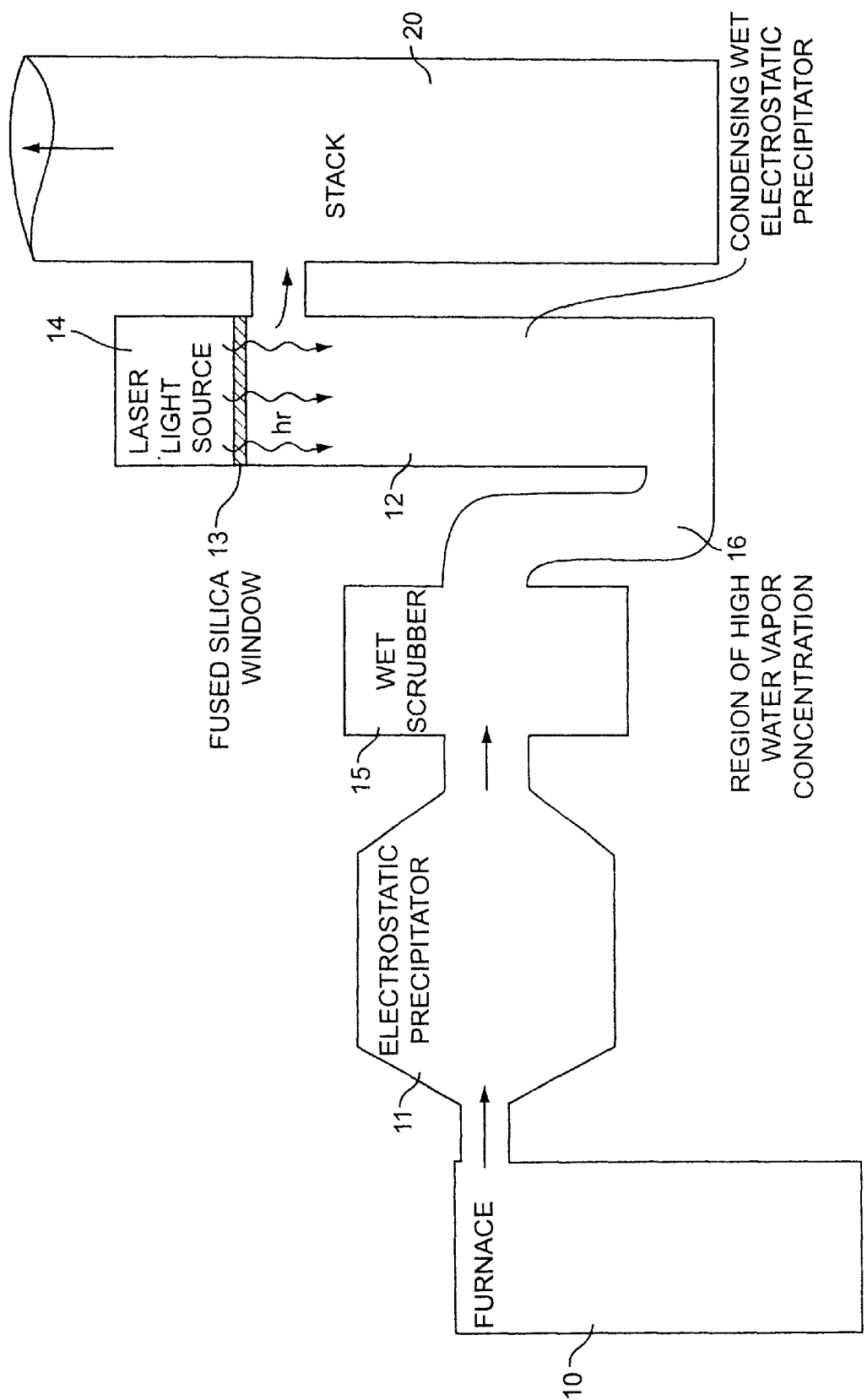
FIG. 2 is a schematic representation of an alternative system employs photoionization of mercury followed by nucleation of water onto mercury ion and removal of charged water droplets via electrostatic precipitation.

Schematic representations of systems which incorporate the methods of the present invention are shown in FIGS. 1 and 2.

In FIG. 1, there is depicted a furnace 10, which incinerates material such as coal, and produces gaseous exhaust which contains elemental mercury. Of course, this invention may also be employed with any other fuel source other than coal, which would produce elemental mercury as a byproduct which is to be removed. The exhaust is directed to an electrostatic precipitator to remove particular matter 11, then to a second electrostatic precipitator 12 for removal of mercury. Note that electrostatic precipitators 11 and 12 can be combined as a single entity when the gas is sufficiently clean that light scattering on particles does not significantly interfere with the absorption of photons by mercury. The exhaust is exposed to the requisite pattern(s) of light (i.e., the appropriate wavelengths in a suitable time frame) preferably through a fused silica window 13 by light source 14. The light source 14 and window 13 may be positioned within the electrostatic precipitator 12 or connected at a surface thereto. Additional protective windows 13, other than fused silica, may also be used within the practice of the invention. All that is required is that exhaust is exposed to light of the appropriate wavelength, intensity and duration while the exhaust passes through the electrostatic precipitator 12 to precipitate the ionized mercury atoms. The mercury depleted exhaust is then emitted through stack 20.

FIG. 2 depicts a similar, but alternative embodiment to that shown in FIG. 1. All like elements are denoted by like numerals. Operations in FIG. 2 are the same as FIG. 1, except that after electrostatic precipitation, the mercury depleted exhaust passes through a wet scrubber 15 for sulfur oxide removal and a region of high water vapor concentration 16 (e.g. a flow cloud chamber). The exhaust then passes through a condensing wet electrostatic precipitator 12 which collects ionized the mercury as well as mercury containing water droplets formed by the nucleation of water onto mercury ions, and the mercury depleted exhaust passes into and is emitted from the stack 20.

Those of skill in the art will recognize the highly schematic nature of the representation in FIGS. 1 and 2, and will recognize that many variations may be designed. For example, more than one light source may be used, the light source may be incorporated inside or outside the electrostatic precipitator, a light source may be located in the region of high water vapor concentration, the wet scrubber could be placed before or after the electrostatic precipitator, the electrostatic precipitator and light source could be incorporated into the emission stack, etc. In addition, the emissions stack itself could be used as the electrostatic precipitator if it was modified to include a high voltage source.

Potential light sources for use in the practice of the present invention include but are not limited to lasers, pulsed germicidal lamps, Hg arc lamps, and Xe flash lamps. Continuous lamps are of little value since the light intensities are very low. However, flash lamps with their 1 to 5 $\mu$s pulses and lasers with their 1 to 10 ns pulses produce high intensity light which can be utilized to ionize mercury. Because two or more different wavelengths of light may be used in the practice of the invention, a combination of two or more different light sources may be utilized. For example, the invention may be practiced using a flashed germicidal lamp (for the 253.65 nm wavelength) followed by a Xe flash lamp or an ArF excimer laser.

To determine the amount of energy required to excite a concentration of mercury atoms in a volume of gas into the $sp^3$ excited state one uses the following.

First one calculates the absorbance of the exhaust gas to determine the amount of light that will be absorbed. Since the mercury concentration is very small (exhaust gas typically has between 90 ppt and 900 ppt of mercury[2,3]), unless the path length is extremely long the absorbance will be small. The absorbance of a gas containing mercury can be calculated using Beer's law.

$$A = -\ln(I/I_o) = \sigma L C \quad (1)$$

where A is the absorbance, I is the transmitted intensity, $I_o$ is entering intensity, $\sigma$ is the extinction coefficient (i.e. absorbance cross section) at the appropriate wavelength, L is the path length, and C is the concentration of mercury. The extinction coefficient, $\sigma$, of mercury[10] at 253.65 nm is $3.3 \times 10^{-18}$ m$^2$. Note that the transmittance, T, is defined by $T = I/I_o$, thus equation (1) can be rewritten as $$T = e^{-\sigma L C} \quad (2)$$

When scattering is negligible, the fraction of light absorbed, F, is $$F = (1-T) = 1 - e^{-\sigma L C} \quad (3)$$

The number of laser pulses, n, that the mercury atoms in the flowing gas are exposed to (in a flow path of length L) is $$n = fL/u \quad (4)$$

where f is the frequency of the light pulses and u is the linear gas flow rate. One can think of the gas flow path as divided into a number of segments equal in number to the number of pulses that each volume of gas is exposed to before exiting the light path. Thus, the thickness of a segment, L/n, is related to the linear gas flow velocity by $$L/n = u/f \quad (5)$$

For mercury concentration×path length products (i.e. C×L) which are small, the intensity of light entering each segment is approximately the same. The fraction of light absorbed by a segment, F, then is $$F = 1 - e^{-\sigma C L/n} \quad (6)$$

The number of photons in a laser pulse, $\nu$, is the pulse energy divided by the energy per photon, i.e.

$$\nu = E/(hc/\lambda) \quad (7)$$

where E is the energy per pulse and $hc/\lambda$ is the energy per photon. Since the laser pulse duration is extremely short compared to a mercury atom's excited state lifetime and there is no excited state at twice the energy of a 253.65 nm photon (thus no resonant absorption) a mercury atom can only absorb one 253.65 nm photon. Thus, $$\text{\# of excited Hg atoms in a segment} = \nu \times F \quad (8)$$

The volume of a segment, V, is the segment cross sectional area, A, times the segment thickness.

$$V = AL/n \quad (9)$$

The concentration of mercury excited by a pulse is thus:

$$\text{Conc. of Hg excited/pulse} = (\nu \times F)/V \quad (10)$$

substituting in for $\nu \times F$ from equations (7) and (8) and for V from equation (9)

$$\text{Conc. of Hg excited/pulse} = (nE/AL)(\lambda/hc)(1 - e^{-\sigma C L/n}) \quad (11)$$

After a segment receives one pulse, the unexcited mercury concentration, $C_1$, is $$C_1 = C_0 - (E/AL)(\lambda/hc)(1 - e^{-\sigma C_0 L}) \quad (12)$$

after two pulses $$C_2 = C_1 - (2E/AL)(\lambda/hc)(1 - e^{-\sigma C_1 L/2}) \quad (13)$$

after j pulses $$C_j = C_{j-1} - (nE/AL)(\lambda/hc)(1 - e^{-\sigma(C_{j-1})L/n}) \quad (14)$$

For weak absorption, i.e. small $\sigma \times L \times C$, the exponential can be linearized, i.e. $e^{-\sigma C L} \approx 1 - \sigma C L$ and upon substitution into equation (14) one obtains $$C_j = C_{j-1} - (nE/AL)(\lambda/hc)(\sigma C_{j-1} L/n) \quad (15)$$
$$= C_{j-1}[1 - (nE/AL)(\lambda/hc)(\sigma L/n)]$$
$$= C_{j-1}[1 - (E\sigma/A)(\lambda/hc)]$$

This linearized form is useful when one exposes each mercury atom to a large number of pulses. One can repeatedly solve for C and substitute in and thus obtain $$C_n = C_0[1 - (E\sigma/A)(\lambda/hc)]^n \quad (16)$$

Let P=Average Power=energy from the laser per unit time (choose one second).

$$P = E \times f = nuE/L \quad (17)$$

For very large n (i.e. a quasicontinuous light source) equation (16) becomes $$C_n = C_0 e^{-(PL\sigma/uA)(\lambda/hc)} \quad (18)$$

The methods of the present invention may be used to remove elemental mercury from many sources. Examples include but are not limited to coal-fired utility exhaust, incinerators, chlorine plants and the like. Further, the method may be utilized with any of several other exhaust treatments, e.g. those which remove sulfur, carbon monoxide, etc.

EXAMPLES

Example 1

Calculations of Excitation Energy Requirements

Calculations were made using a volumetric gas flow rate of 472 m$^3$/s (i.e. one typical of a 250 MW$_E$ power plant[3]). For other gas flow rates these numbers will scale linearly. If one uses 1.23 m as the radius for a typical cylindrical stack (i.e. A=4.72 m$^2$), then this volumetric flow rate corresponds to a linear flow rate of 100 m/s. For a mercury concentration[3] of 1 $\mu$g/m$^3$ (i.e. C=90 ppt=3×10$^{15}$ Hg atoms/m$^3$) using the known value of the extinction coefficient[10] at 253.65 nm, $3.3 \times 10^{-18}$ m$^2$, one can calculate the required pulse energy and average power for a given path length and laser frequency. A path length of 10 m and a laser pulse rate of 10 pps (i.e. f=10 Hz) provides one light pulse to each mercury atom before the atom leaves the light path. For a single pulse to provide an excitation of 99% of the mercury (i.e. $C/C_0=0.01$), one can solve equation (16) for E and substitute in the above values to obtain the energy per pulse requirements.

|  | $E = (1-C/C_0)(A/\sigma)(hc/\lambda)$ | $E = 1.11$ J |
|---|---|---|
| Average Power | $P = Ef = (EQ)/(AL)$ | $P = 11.1$ W |
| Laser frequency | $f = nu/L$ | $f = 10$ s$^{-1}$ |

Similarly for a quasicontinuous light source equation (18) results in an average power requirement of 51.6 W for 99% excitation.

Repeating the above calculations for 99% excitation and a mercury concentration of $3 \times 10^{16}$ Hg atoms/m$^3$ results in no change in the energy or power requirements. This occurs, only when using the equation that includes a linear approximation for the exponential, because the amount of light absorbed increases linearly with the concentration and while the number of mercury atoms that need to be excited increases by an order of magnitude, the number of photons absorbed also increases at the same rate.

For a desired removal of 90% at a laser frequency of 10 Hz using the same flow rates and dimensions as in the above example with a concentration of $3 \times 10^{15}$ Hg atoms/m$^3$, using equation (12) it is found that for a single pulse traveling through a 10 m path length the energy is given by $$C_1 = C_0 - (E/AL)(\lambda/hc)(1-e^{-\sigma C_0 L})$$

$$C_1/C_0 = 1 - (E/AL)(\lambda/hc)(1-e^{-\sigma C_0 L})/C_0$$

After solving for E one obtains $$E = (1-C_1/C_0)[(1/AL)(\lambda/hc)(1-e^{-\sigma C_0 L})/C_0]^{-1} \quad (19)$$

For $C_1/C_0 = 0.1$ one obtains $$E = 1.059 \; J$$

The number of photons used for the excitation is $$\#photons\;used = (C_0 - C_1)AL = 1.274 \times 10^{17} \; photons$$

The energy left in the pulse after traveling through 10 m of gas is $$E_1 = E_0 - \#photons\;used(hc/\lambda) = 0.959 \; J$$

Calculations may also be carried out for the situation in which the light is co-current to the gas flow, for the same gas flow but for a path length which is twice as long (i.e. L=20 m). For this case, the energy $E_1$ will enter 10 m of gas that has already been reduced in concentration by 90% to the concentration $C_1$. The new mercury concentration due to $E_1$ will be $$C_2 = C_1 - (E/AL)(\lambda/hc)(1-e^{-\sigma C_1 L})$$

$$C_2 = 4.44 \times 10^{13}$$

By doubling the path length to 20 m so that two pulses enter the system before the gas leaves the removal rate is 98.5% instead of 90%. If instead only 90% removal for the 20 m length is desired, then one calculates a new pulse energy by solving equation (16) for E with n=2.

$$C_2 = C_0[1-(E\sigma/A)(\lambda/hc)]^2$$

$$E = [1-(C_2/C_0)^{1/2}](Ahc/\sigma\lambda)$$

$$E = 0.77 \; J$$

This calculation shows that by doubling the path length, the required pulse energy to remove 90% of the mercury is reduced by 27.3% and the average power is 7.7 W. If the path length is once again doubled to 40 m and the pulse energy is calculated using equation (16) with n=4 then E=0.49 J which is 36% less than the pulse energy for the 20 m case. Calculations of the energy for a single pulse to remove 90% of the mercury if the path length is 20 m (i.e. for a laser frequency of 5 Hz instead of 10 Hz) may also be made. Using equation (19), the energy for a single pulse is 1.11 J with an average power of 5.55 W. This indicates that by exposing each mercury atom to multiple pulses one can lower the energy needed per pulse, but by exposing each mercury atom to only one pulse of sufficient intensity one can use the least average power.

Example 2

Mass of Mercury Removed

Once the mercury has impacted on the collection surface it is necessary to prevent the mercury from revaporizing. This is accomplished by making the collection surface out of a substance which can either oxidize or form an amalgam with the mercury. It is therefore of interest to calculate how fast mercury will accumulate on the surface. This can be done using the following equations.

$$m = 200.59[g/mol]/6.023 \times 10^{23} \; [Hg \; atoms/mol]$$

$$m = 3.343 \times 10^{-22}[g/Hg \; atom]$$

Fraction of unremoved mercury, $\epsilon = 0.01$ $$C = 3 \times 10^{15}[Hg \; atom/m^3]$$

$$M = m(1-\epsilon)CQ$$

For a 250 MW$_e$ Power Plant
$Q = 472 \; m^3/s$

| Time | M [g] | $V_{Hg}$ [cm$^3$] |
|---|---|---|
| second | $5.2 \times 10^{-5}$ | $3.8 \times 10^{-6}$ |
| hour | 0.187 | $1.37 \times 10^{-2}$ |
| day | 4.49 | 0.329 |
| year | 1640 | 120 |

For $\geq 99\%$ removal of mercury

Assuming that the mercury collection surface is one large tube with a radius of 1.23 m and length of 10 m gives a surface area of approximately 70 m$^2$. The mercury film thickness that will build up on the surface is given by $$film\;thickness = V_{hg}/A_s$$

At a collection rate of $1.2 \times 10^{-4}$ m$^3$ per year results the production of a mercury film at a rate of 1.7 μm per year. Even at a mercury concentration of 900 ppt the mercury film will still only be produced at a rate of 17 μm per year.

This example demonstrates that the collection surface will not need to be replaced often due to mercury buildup, thus underscoring the practical and economical aspects of the present invention.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

REFERENCES

1. Environmental Protection Agency, "Regulatory Finding on the Emissions In of Hazardous Air Pollutants from Electric Utility Steam Generating Units", *Federal Register*, 65, No. 245, 79825–79831, Dec. 20 (2000)
2. Johnson, J, "Power Plant to Limit Mercury". *Chemical Engineering News*, Jan. 1, 18–19 (2001).
3. Yokoyama, T, et al., "Mercury emissions from a coal-fired power plant in Japan", *Science of the Total Environment*, 259, 97–103 (2000)
4. *Encyclopedia of Chemical Technology*, 4th edition, Vol. 1, 778–787, New York: Wiley, 1998.
5. Ray, Isaac, "The Quest for a Better Submicron Particle Trap", *Environmental Technology*, May/June 1997
6. Ogawa, A., *Separation of Particles from Air and Gases*, Vol. 2, 117–122, Boca Raton: CRC Press, 1984
7. Ereifej, H. N., Doster, G. J., et al., "Extreme Sensitivity in Trace Element Detection", *Appl. Phys. B* 68, 141–144 (1999).
8. Clevenger, W. L. et al., "Analytical time-resolved laser enhanced ionization spectroscopy I", *Spectrochimica Acta Part B*, 52, 295–304 (1997)
9. Podshivalov, A. A., et al., "A novel and efficient excitation and ionization scheme for laser resonance ionization of mercury", *Spectrochimica Acta Part B*, 54, 1793–1799 (2000)
10. Edner, H, Faris, G. W., Sunesson, A., and Svanberg, S., "Atmospheric atomic mercury monitoring using differential absorption lidar techniques". *Applied Optics*, 28(5), 921–930 (1989)

Having thus described my invention, what I claim as new and desire to secure by Letters Patent is as follows:

1. A method for removing elemental mercury from an exhaust source comprising the steps of:
   photoionizing elemental mercury in an exhaust to form ionized mercury atoms; and
   electrostatically precipitating the ionized mercury atoms from the exhaust.

2. The method of claim 1 further comprising the step of inducing nucleation of water vapor onto said ionized mercury atoms.

3. The method of claim 2 wherein said step of nucleation is carried out by exposing the ionized mercury atoms to supersaturated water vapor.

4. The method of claim 2 wherein said steps of photoionizing and inducing nucleation are performed simultaneously.

5. The method of claim 2 wherein said step of photoionizing is performed with two or more different light sources, each emitting light at different wavelengths.

6. The method of claim 1 wherein said photoionizing step includes the step of initially exposing said elemental mercury to light of a wavelength of 253.65 nm.

7. The method of claim 6 wherein said photoionizing step includes the step of exposing ionized mercury, after said initially exposing step, to light of at least one different wavelength.

8. The method of claim 7 wherein said at least one different wavelength is selected from the group consisting of 313.18 nm, 435.83 nm and 626.36 nm.

9. A method for removing elemental mercury from an emissions source comprising the steps of:
   exposing an emissions source containing elemental mercury to electromagnetic radiation which excites elemental mercury;
   providing additional electromagnetic energy having a combined energy of greater than 5.68 eV to ionize the excited elemental mercury; and
   electrostatically precipitating the ionized elemental mercury.

10. The method of claim 9 further comprising the step of inducing nucleation of water vapor onto said ionized elemental mercury.

11. The method of claim 10 wherein said step of nucleation is carried out by exposing the ionized mercury atoms to supersaturated water vapor.

12. The method of claim 9 wherein said electromagnetic radiation is of a wavelength which excites elemental mercury.

13. The method of claim 12 wherein said wavelength is 253.65 nm.

14. The method of claim 9 wherein said additional electromagnetic energy is of a wavelength different from said electromagnetic radiation used in said exposing step.

15. An apparatus for removing elemental mercury from an exhaust source comprising:
   at least one light source for photoionizing elemental mercury in an exhaust to form ionized mercury atoms; and
   an electrostatic precipitator for precipitating the ionized mercury atoms from the exhaust.

16. The apparatus of claim 15 further comprising a means for inducing nucleation of water vapor onto said ionized mercury atoms.

17. The apparatus of claim 16 wherein said means for inducing nucleation of water vapor comprises a source of supersaturated water vapor.

18. The apparatus of claim 15 wherein said at least one light source produces light of a wavelength of 253.65 nm.

19. The apparatus of claim 15 wherein said at least one light source produces light of two or more wavelengths selected from the group consisting of 253.65 nm, 313.18 nm, 435.83 nm and 626.36 nm.

20. The apparatus of claim 15 wherein said at least one light source produces a first light that excites the elemental mercury to an excited state and a second light that ionizes the excited elemental mercury.

21. The apparatus of claim 20 wherein said first light and second light are different from each other.

22. The apparatus of claim 20 wherein said second light provides additional electromagnetic energy having a combined energy of greater than 5.68 eV.

23. The apparatus of claim 15 wherein said at least one light source directs light into said electrostatic precipitator.

24. The apparatus of claim 15 wherein said at least one light source is positioned inside said electrostatic precipitator.

25. The apparatus of claim 15 wherein said at least one light source is positioned outside said electrostatic precipitator.

26. The apparatus of claim 15 further comprising a means for removing particulates from said exhaust.

27. The apparatus of claim 15 further comprising a means for removing sulfur oxides from said exhaust.

28. An apparatus for removing noxious material from an exhaust, comprising:
   means for removing particulate material from the exhaust;
   at least one light source for photoionizing elemental mercury in the exhaust to form ionized mercury atoms;
   an electrostatic precipitator for precipitating the ionized mercury atoms from the exhaust; and
   a stack for releasing the exhaust with reduced mercury levels.

29. The apparatus of claim 28 further comprising a means for removing sulfur oxides from the exhaust.

30. The apparatus of claim 28 further comprising a means for inducing nucleation of water vapor onto said ionized mercury atoms.

* * * * *